US012489198B2

(12) United States Patent
Wu et al.

(10) Patent No.: US 12,489,198 B2
(45) Date of Patent: Dec. 2, 2025

(54) BASE STATION ANTENNAS HAVING BENT RADIATOR ARMS

(71) Applicant: Outdoor Wireless Networks LLC, Claremont, NC (US)

(72) Inventors: Ligang Wu, Suzhou (CN); Uparnabh Ghoshal, West Bengal (IN); Kumara Swamy Kasani, Telangana (IN); Xiangyang Ai, Plano, TX (US)

(73) Assignee: Outdoor Wireless Networks LLC, Richardson, TX (US)

(*) Notice: Subject to any disclaimer, the term of this patent is extended or adjusted under 35 U.S.C. 154(b) by 219 days.

(21) Appl. No.: 18/251,648

(22) PCT Filed: Nov. 20, 2020

(86) PCT No.: PCT/CN2020/130392
§ 371 (c)(1),
(2) Date: May 3, 2023

(87) PCT Pub. No.: WO2022/104682
PCT Pub. Date: May 27, 2022

(65) Prior Publication Data
US 2024/0006744 A1 Jan. 4, 2024

(51) Int. Cl.
*H01Q 1/36* (2006.01)
*H01Q 1/24* (2006.01)
*H01Q 9/18* (2006.01)
*H01Q 19/10* (2006.01)
*H01Q 21/06* (2006.01)

(52) U.S. Cl.
CPC ............... *H01Q 1/246* (2013.01); *H01Q 1/36* (2013.01); *H01Q 9/18* (2013.01); *H01Q 19/104* (2013.01); *H01Q 21/062* (2013.01)

(58) Field of Classification Search
None
See application file for complete search history.

(56) References Cited

U.S. PATENT DOCUMENTS 6,034,649 A * 3/2000 Wilson ..................... H01Q 9/28 343/797
9,831,548 B2 11/2017 Timofeev et al.
(Continued)

FOREIGN PATENT DOCUMENTS

CN 1254966 A 5/2000
CN 104685718 A 6/2015
(Continued)

OTHER PUBLICATIONS

"International Search Report and Written Opinion of the International Searching Authority", International Application No. PCT/CN2020/130392, Aug. 11, 2021, 9 pp.
(Continued)

*Primary Examiner* — Dameon E Levi
*Assistant Examiner* — Anh N Ho
(74) *Attorney, Agent, or Firm* — Myers Bigel, P.A.

(57) ABSTRACT

Twin-beam base station antennas are provided. A twin-beam base station antenna includes a plurality of vertical columns of radiating elements that are configured to transmit radio frequency signals in a frequency band. The radiating elements have bent metal radiator arms including tip portions that face respective center axes of the radiating elements.

20 Claims, 8 Drawing Sheets

(56) References Cited

U.S. PATENT DOCUMENTS

| | | | | |
|---|---|---|---|---|
| 2008/0309568 | A1* | 12/2008 | Deng | H01Q 19/104 343/835 |
| 2014/0111396 | A1* | 4/2014 | Hyjazie | H01Q 21/26 343/893 |
| 2014/0168027 | A1* | 6/2014 | Katipally | H01Q 1/526 343/833 |
| 2017/0062940 | A1 | 3/2017 | Cao | |
| 2018/0358693 | A1 | 12/2018 | Yoshihara et al. | |
| 2020/0067205 | A1 | 2/2020 | Segador Alvarez et al. | |
| 2020/0212598 | A1* | 7/2020 | Gonzalez | H01Q 25/001 |

FOREIGN PATENT DOCUMENTS

| | | | | |
|---|---|---|---|---|
| CN | 205282640 | U | * | 6/2016 |
| CN | 108666769 | A | | 10/2018 |
| CN | 109509970 | A | | 3/2019 |
| CN | 109713433 | A | * | 5/2019 |
| CN | 110832699 | A | | 2/2020 |
| CN | 111952732 | A | | 11/2020 |
| IN | 202178379 | U | | 3/2012 |
| JP | 2015080148 | A | | 4/2015 |
| WO | 110622351 | A | | 12/2019 |
| WO | 2020027914 | A1 | | 2/2020 |
| WO | 2020205225 | A1 | | 10/2020 |

OTHER PUBLICATIONS

Extended European Search Report corresponding to European Application No. 20961973.3 (9 pages) (Aug. 9, 2024).

* cited by examiner

BASE STATION ANTENNAS HAVING BENT RADIATOR ARMS

CROSS-REFERENCE TO RELATED APPLICATION

The present application is a 35 U.S.C. § 371 national stage application of PCT Application No. PCT/CN2020/130392, filed on Nov. 20, 2020, the disclosure of which is hereby incorporated herein in its entirety as if set forth fully herein.

FIELD

The present invention generally relates to radio communications and, more particularly, to twin-beam base station antennas used in cellular and other communications systems.

BACKGROUND

Cellular communications systems are well known in the art. In a typical cellular communications system, a geographic area is divided into a series of regions that are referred to as "cells," and each cell is served by a base station. The base station may include baseband equipment, radios, and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The base station antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

A common base station configuration is a "three sector" configuration in which the cell is divided into three 120° sectors in the azimuth plane, and the base station includes three base station antennas that provide coverage to the three respective sectors. The azimuth plane refers to a horizontal plane that bisects the base station antenna and is parallel to the plane defined by the horizon. In a three sector configuration, the antenna beams generated by each base station antenna typically have a half power beam width ("HPBW") in the azimuth plane of about 65° so that the antenna beams provide good coverage throughout a 120° sector, Typically, each base station antenna will include a vertically-extending column of radiating elements that together generate an antenna beam. Each radiating element in the column may have a HPBW of approximately 65° so that the antenna beam generated by the column of radiating elements will provide coverage to a 120° sector in the azimuth plane. The base station antenna may include multiple columns of radiating elements that operate in the same or different frequency bands.

Most modern base station antennas also include remotely controlled phase shifter/power divider circuits along the RE transmission paths through the antenna that allow phase taper to be applied to the sub-components of an RF signal that are supplied to the radiating element in an array. By adjusting the amount of phase taper applied, the resulting antenna beams may be electrically downtilted to a desired degree in the vertical or "elevation" plane. This technique may be used to adjust how far an antenna beam extends outwardly from an antenna, and hence can be used to adjust the coverage area of the base station antenna.

Sector-splitting refers to a technique where the coverage area for a base station is divided into more than three sectors in the azimuth plane, such as six, nine, or even twelve sectors. A six-sector base station will have six 60° sectors in the azimuth plane. Splitting each 120° sector into two sub-sectors increases system capacity because each antenna beam provides coverage to a smaller area, and therefore can provide higher antenna gain and/or allow for frequency reuse within a 120° sector. In six-sector sector-splitting; applications, a single twin-beam antenna is typically used for each 120° sector. The twin-beam antenna generates two separate antenna beams that each have a reduced size in the azimuth plane and that each point in different directions in the azimuth plane, thereby splitting the sector into two smaller sub-sectors. The antenna beams generated by a twin-beam antenna used in a six-sector configuration preferably have azimuth HPBW values of, for example, between about 27°-39°, and the pointing directions for the first and second sector-splitting antenna beams in the azimuth plane are typically at about −27° and about 27°, respectively, from a 0° "azimuth boresight pointing direction" of the antenna, which refers to a horizontal axis that extends from the base station antenna that points to the center, in the azimuth plane, of the sector served by the base station antenna.

Several approaches have been used to implement twin-beam antennas that provide coverage to respective first and second sub-sectors of a 120° sector in the azimuth plane. In a first approach, first and second columns of radiating elements are mounted on the two major interior faces of a V-shaped reflector. The angle defined by the interior surface of the "V" shaped reflector may be about 54° so that the two columns of radiating elements are mechanically positioned or "steered" to point at azimuth angles of about −27° and 27°, respectively (i.e., toward the middle of the respective sub-sectors). Since the azimuth HPBW of typical radiating elements is usually appropriate for covering a full 120° sector, an RF lens is mounted in front of the two columns of radiating elements that narrows the azimuth HPBW of each antenna beam by a suitable amount for providing coverage to a 60° sub-sector. Unfortunately, however, the use of RF lenses may increase the size, weight, and cost of the base station antenna, and the amount that the RF lens narrows the beamwidth is a function of frequency, making it difficult to obtain suitable coverage when wideband radiating elements are used that operate over a wide frequency range (e.g., radiating elements that operate over the full 1.7-2.7 gigahertz ("GHz") cellular frequency range).

In a second approach, two or more columns of radiating elements (typically 2-4 columns) are mounted on a flat reflector so that each column points toward the azimuth boresight pointing direction for the antenna. Two RF ports (per polarization) are coupled to all of the columns of radiating elements through a beamforming network such as a Butler Matrix. The beamforming network generates two separate antenna beams (per polarization) based on the RF signals input at the two RF ports, and the antenna beams are electrically steered off the boresight pointing direction of the antenna at azimuth angles of about −27° and 27° to provide coverage to the two sub-sectors. With such beamforming network based twin-beam antennas, the pointing angle in the azimuth plane of each antenna beam and the HPBW of each antenna beam may vary as a function of the frequency of the RF signals input at the two RF ports. In particular, the azimuth pointing direction of the antenna beams (i.e., the azimuth angle where peak gain occurs) tends to move toward the azimuth boresight pointing direction of the antenna and the azimuth HPBW tends to get smaller with increasing frequency. This can lead to a large variation as a function of frequency in the power level of the antenna beam at the outside edges of the sub-sectors, which is undesirable.

In a third approach, a multi-column array of radiating elements (typically three columns per array) is mounted on each exterior panel of a V-shaped reflector to provide a sector-splitting twin-beam antenna. The antenna beams generated by each multi-column array may vary less as a function of frequency as compared to both the lensed and beamforming based twin beam antennas discussed above. Unfortunately, such sector-splitting antennas may require a large number of radiating elements, which increases the cost and weight of the antenna. Additionally, the inclusion of six columns of radiating elements may increase the required width for the antenna and the V-shaped reflector may increase the depth of the antenna, both of which may be undesirable.

Generally speaking, cellular operators desire twin-beam antennas that have azimuth HPBW values of anywhere between 30°-38°, so long as the azimuth HPBW values do not vary significantly (e.g., more than 12°) across the operating frequency band. Likewise, the azimuth pointing angles of the antenna beam peaks may vary anywhere between +/−26° to +1-33°, so long as the azimuth pointing angle does not vary significantly (e.g., more than 4°) across the operating frequency band. The peak azimuth sidelobe levels should preferably be at least 15 decibels ("dB") below the peak gain value.

SUMMARY

Pursuant to embodiments of the present invention, a twin-beam base station antenna is provided that may include a reflector. The twin-beam base station antenna may include a plurality of vertically-staggered vertical columns of radiating elements that are on a surface of the reflector and are configured to transmit RF signals in a frequency band. A metal radiator arm of each of the radiating elements may include a base portion that is parallel to the surface of the reflector and a tip portion that is not parallel to the surface of the reflector. Moreover, a shortest distance between consecutive ones of the vertical columns is more than 8.4 millimeters.

In some embodiments, each of the radiating elements may include a printed circuit board ("PCB") that is parallel to the surface of the reflector. The base portion of the metal radiator arm may be on the PCB. Moreover, the tip portion of the metal radiator arm may protrude either away from the surface of the reflector or toward the surface of the reflector.

According to some embodiments, the tip portion may be a first among a plurality of tip portions of respective metal arms that are on the PCB. For example, the first of the tip portions and a second of the tip portions may both protrude away from the surface of the reflector. As another example, the first of the tip portions and a second of the tip portions may both protrude toward the surface of the reflector. In yet another example, the first of the tip portions may protrude away from the surface of the reflector, and a second of the tip portions may protrude toward the surface of the reflector.

In some embodiments, the twin-beam base station antenna may include a conductive plate that is on the PCB and that couples the base portion of the metal radiator arm to the PCB. The conductive plate and the base portion of the metal radiator arm may be different metals, respectively. Moreover, the conductive plate may be a copper plate.

According to some embodiments, a widest dimension of each of the radiating elements may be no more than 68 millimeters in a direction that parallels the surface of the reflector.

In some embodiments, the vertical columns may include consecutive first, second, third, and fourth vertical columns, and the first and third vertical columns may be vertically staggered relative to the second and fourth vertical columns. Moreover, the first and second vertical columns may be spaced apart from each other by at least 35 millimeters.

According to some embodiments, the base portion of the metal radiator arm and the tip portion of the metal radiator arm may be contiguous portions of a continuous piece of sheet metal, and opposite edge regions of the base portion may be flat.

A twin-beam base station antenna, according to some embodiments, may include a plurality of vertically-staggered vertical columns of radiating elements that are configured to transmit RF signals in a frequency band and that have bent metal radiator arms including tip portions that face respective center axes of the radiating elements.

In some embodiments, consecutive ones of the vertical columns may be spaced apart from each other by at least 30 millimeters.

According to some embodiments, a first and a second of the tip portions may protrude in opposite directions, respectively. Moreover, the twin-beam base station antenna may include a reflector, the radiating elements may be on a surface of the reflector, and each of the opposite directions may be nonparallel to the surface of the reflector.

A twin-beam base station antenna, according to some embodiments, may include a reflector. The twin-beam base station antenna may include first and second vertical columns of radiating elements that are on a surface of the reflector and are configured to transmit RF signals in a frequency band. A first metal dipole arm of a first of the radiating elements of the first vertical column may include a first tip portion that protrudes away from the surface of the reflector. Moreover, a second metal dipole arm of a second of the radiating elements of the second vertical column may include a second tip portion that protrudes toward the surface of the reflector.

In some embodiments, a third metal dipole arm of the first of the radiating elements may include a third tip portion that protrudes toward the surface of the reflector.

According to some embodiments, the twin-beam base station antenna may include third and fourth vertical columns of radiating elements that are on the surface of the reflector and are configured to transmit RF signals in the frequency band. The first, second, third, and fourth vertical columns may be consecutive vertical columns. The first and third vertical columns may be vertically staggered relative to the second and fourth vertical columns. The second tip portion may be closer to the first tip portion than to any other tip portion of the first vertical column. Moreover, a shortest distance between the first and second vertical columns may be longer than a length of the first tip portion.

DETAILED DESCRIPTION

Pursuant to embodiments of the present invention, improved twin-beam base station antennas are provided that overcome or mitigate various of the difficulties with conventional columns of base station antenna radiating elements. The twin-beam antennas according to embodiments of the present invention may include compact radiating elements that have a relatively large column-to-column spacing. For example, the radiating elements may have bent metal radiator arms. In particular, tip portions of the radiator arms that would conventionally extend outward toward adjacent columns of radiating elements may instead protrude up or down, thus narrowing a dimension (e.g., width) of the radiating elements. The twin-beam base station antennas according to embodiments of the present invention may therefore improve antenna performance, such as by reducing mutual coupling between adjacent columns of radiating elements.

The radiating elements may be, for example, dual-polarized radiating elements. Each dual-polarized radiating element includes a first polarization radiator and a second polarization radiator. The most commonly used dual-polarized radiating elements are crossed-dipole radiating elements that include a slant −45° dipole radiator and a slant +45° dipole radiator. The slant −45° dipole radiator of each crossed-dipole radiating element in a column is coupled to a first (−45°) RF port, and the +45° dipole radiator of each crossed-dipole radiating element in the column is coupled to a second (+45°) RF port. Such a column of crossed-dipole radiating elements will generate a first −45° polarization antenna beam in response to RF signals input at the first RF port, and will generate a second +45° polarization antenna beam in response to RF signals input at the second RF port. Example dual-polarization dipole radiating elements are discussed in International Patent Application No. PCT/US2020/023106, the disclosure of which is hereby incorporated herein by reference in its entirety. It will be appreciated, however, that any appropriate radiating elements may be used, including, for example, single polarization dipole radiating elements or patch radiating elements, in other embodiments.

Figure 1:
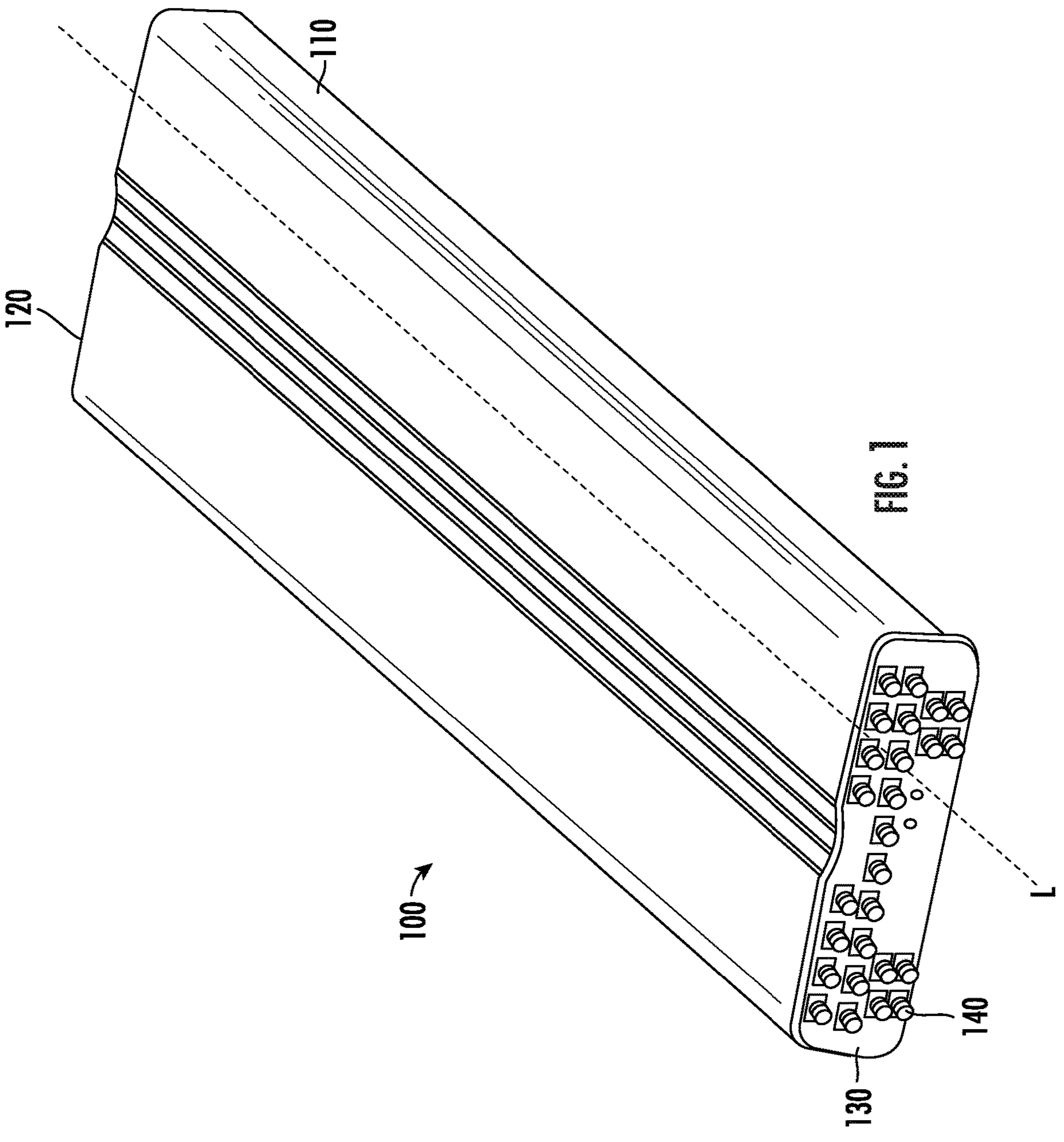
FIG. 1 is a front perspective view of a base station antenna according to embodiments of the present invention.

FIG. 1 is a front perspective view of a base station antenna 100 according to embodiments of the present invention. The antenna 100 may be, for example, a cellular base station antenna at a macrocell base station. It will be appreciated, however, that the techniques disclosed herein may also be applied to other base station antennas such as, for example, small cell base station antennas. As shown in FIG. 1, the antenna 100 is an elongated structure and has a generally rectangular shape. The antenna 100 includes a radome 110. In some embodiments, the antenna 100 further includes a top end cap 120 and/or a bottom end cap 130. The bottom end cap 130 may include a plurality of RF connectors 140 mounted therein. The connectors 140, which may also be referred to herein as "ports," are not limited, however, to being located on the bottom end cap 130. Rather, one or more of the connectors 140 may be provided on, for example, the rear (i.e., back) side of the radome 110 that is opposite the front side of the radome 110. The antenna 100 is typically mounted in a vertical configuration (i.e., the long side of the antenna 100 extends along a vertical axis L with respect to Earth).

The connectors 140 may be coupled to groups of radiating elements 450 (FIG. 4A) through beamforming networks such as Butler Matrices or other beamforming circuitry. Example arrays and beamforming networks coupled thereto are discussed in International Publication No. WO 2020/027914, the disclosure of which is hereby incorporated herein by reference in its entirety.

Figure 2A:
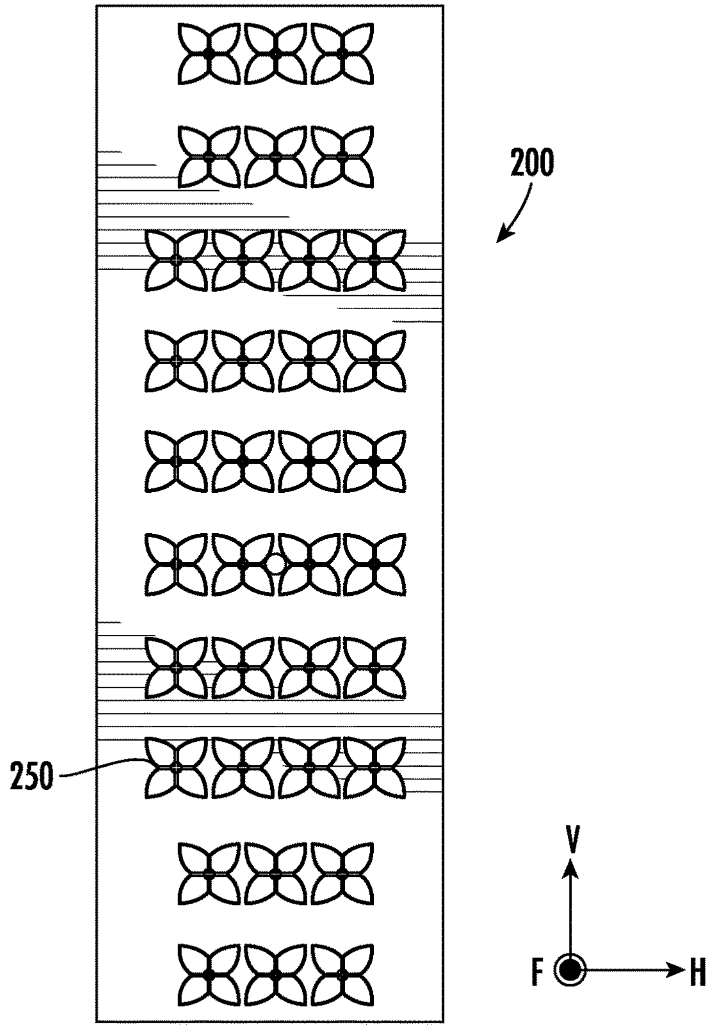
FIG. 2A PRIOR ART
FIG. 2A is a front view of an antenna assembly of a prior art base station antenna.

FIG. 2A is a front view of an antenna assembly 200 of a prior art base station antenna. In particular, FIG. 2A shows that the antenna assembly 200 includes one or more groups, such as arrays or sub-arrays, of radiating elements 250. For example, some or all of the radiating elements 250 may be in vertical columns that are spaced apart from each other in a horizontal direction H. Operation of the antenna of FIG. 2A is described in detail in U.S. Pat. No. 9,831,548, the entire content of which is incorporated herein by reference. As shown in FIG. 2A, the radiating elements 250 are arranged in rows, but some of the rows have different numbers of radiating elements. As a result, the vertical columns of radiating elements include a degree of stagger in the horizontal direction H, and not all of the columns have the same number of radiating elements. Such an arrangement may facilitate generating antenna beams having a desired azimuth HPBW.

Figure 2B:
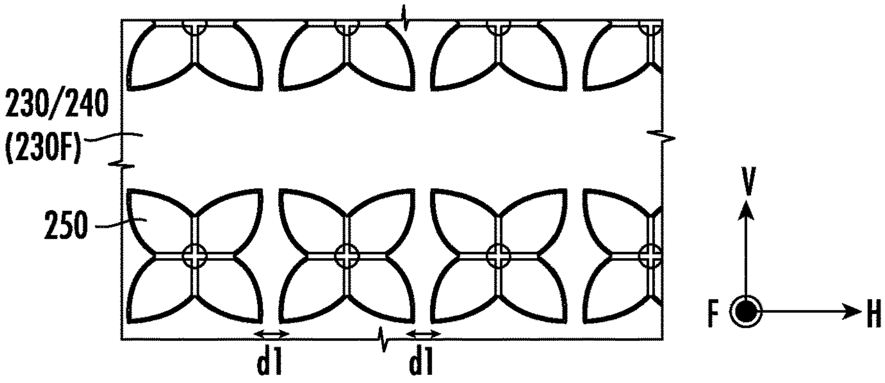
FIG. 2B PRIOR ART
FIG. 2B is an enlarged partial front view of the antenna assembly of FIG. 2A.

FIG. 23 is an enlarged partial front view of the antenna assembly 200 of FIG. 2A. As shown in FIG. 2B, adjacent vertical columns of the radiating elements 250 have a shortest distance d1 therebetween in the horizontal direction H. For example, the distance d1 may be 8.4 millimeters ("mm"). Because this distance is relatively short, strong mutual coupling may occur between radiating elements 250 of adjacent vertical columns. The mutual coupling between radiating elements 250 of adjacent columns may tend to be the strongest at the lower end of the operating frequency band of the radiating elements 250, as the separation between columns in terms of wavelengths is smaller with lower frequency. As an example, for radiating elements 250 that operate in the 1,695-2,690 megahertz ("MHz") frequency band, the mutual coupling between the vertical columns of radiating elements may tend to be strongest at 1,695 MHz. The stronger the mutual coupling, the greater the distortion on the azimuth beamwidth of the antenna beam. Moreover, strong mutual coupling also leads to an undesirable increase in cross polarization ratio ("CPR"), which is a measure of how much the polarization purity of the antenna beams is distorted. Moreover, the mutual coupling may also lead to the generation of high grating lobes in the higher portion of the operating frequency band (e.g., at frequencies higher than 2,400 MHz for the above-described radiating elements 250 that operate in the 1,695-2,690 MHz frequency band).

Each radiating element 250 may be on a front surface 230F of a reflector 230 of the antenna. In some embodiments, one or more groups of the radiating elements 250 may share a feed board 240 that is on the reflector 230. For example, the radiating elements 250 may all be on the same feed board 240, or different arrays/sub-arrays of the radiating elements 250 may be on respective feed boards 240.

Figure 2C:
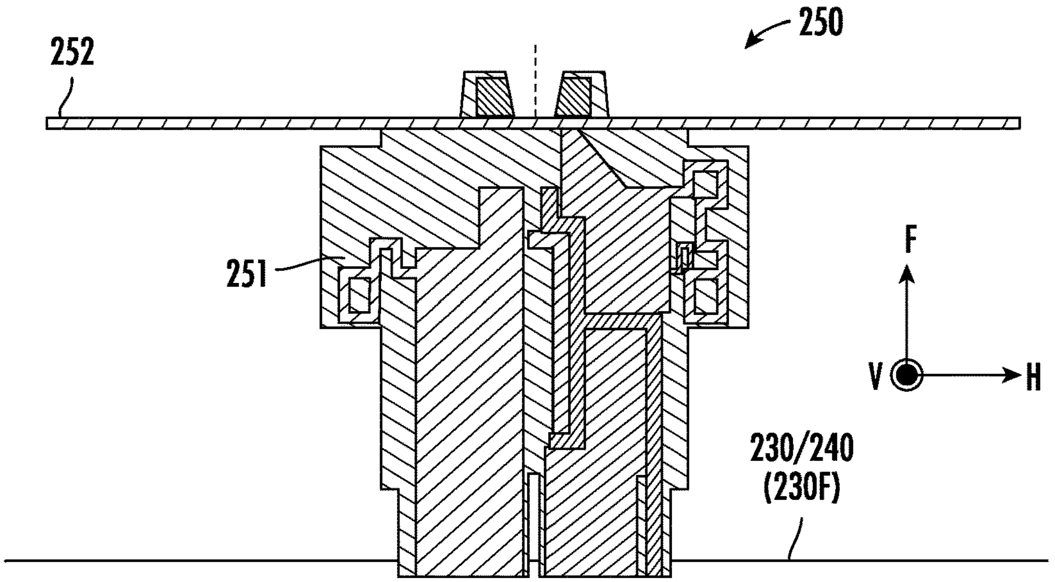
FIG. 2C PRIOR ART
FIG. 2C is an enlarged profile view of a radiating element of FIG. 2B.

FIG. 2C is an enlarged profile view of one of the radiating elements 250 of FIG. 2B. The radiating element 250 will be rotated 90° from the orientation shown in FIG. 2C when the base station antenna including the antenna assembly 200 is mounted for use. The radiating element 250 may include a pair of PCB feed stalks 251 that extend from the front surface 230F of the reflector 230 in a forward direction F. Moreover, the radiating element 250 may include a radiator PCB 252 that is on the feed stalks 251 and positioned to extend parallel to the front surface 230F of the reflector 230.

Figure 2D:
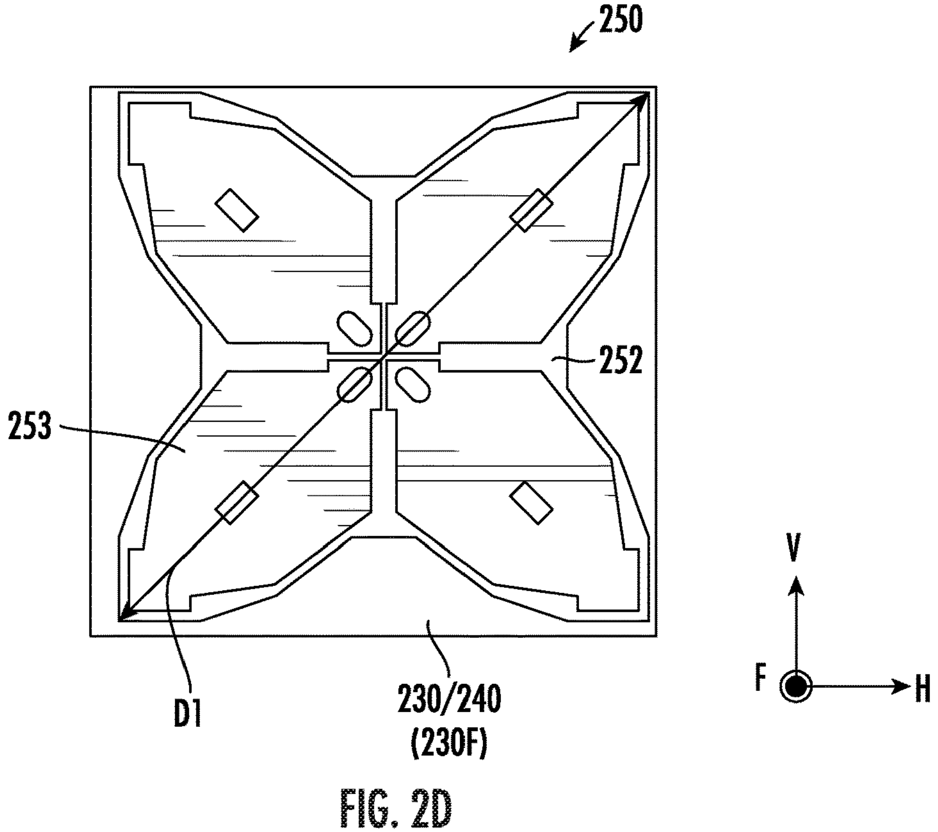
FIG. 2D PRIOR ART
FIG. 2D is a front view of the radiating element of FIG. 2C.

FIG. 2D is a front view of the radiating element 250 of FIG. 2C. As shown in FIG. 21), the radiating element 250 may include a plurality of flat dipole arms 253 on the PCB 252. A widest dimension D1 of the radiating element 250 (which dimensions here are the distances along the diagonals defined by each dipole radiator) may be, for example, 92.8 mm.

Figure 3A:
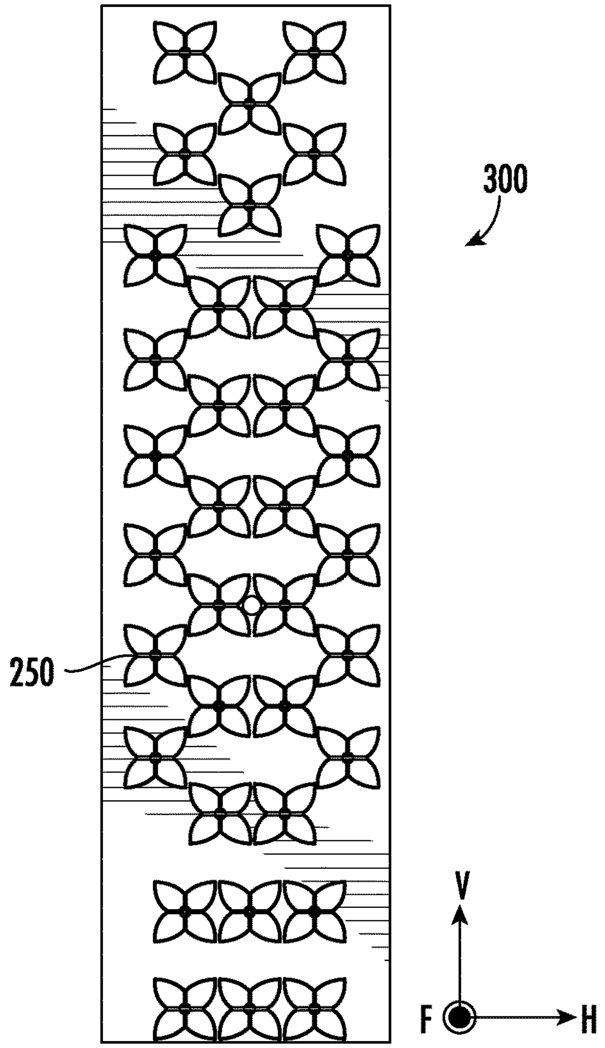
FIG. 3A PRIOR ART
FIG. 3A is a front view of an antenna assembly of another prior art base station antenna.

FIG. 3A is a front view of an antenna assembly 300 of another prior art base station antenna. Unlike the antenna assembly 200 (FIG. 2A), in which the radiating elements 250 are aligned in rows, the antenna assembly 300 of FIG. 3A further includes vertically-staggered vertical columns of radiating elements 250 so that staggers are present in both the row and column direction. In particular, outermost vertical columns in a middle region of the assembly 300 are staggered relative to inner vertical columns therebetween. This staggering of the radiating elements 250 can improve (e.g., reduce the magnitude of) grating lobes that may otherwise be problematic at higher frequencies (e.g., above 2,400 MHz). Strong cross polarization distortion may occur, however, in a high-power region of the assembly 300, so mutual coupling and losses at 1,695 MHz with the assembly 300 may be similar to those with the assembly 200.

Figure 3B:
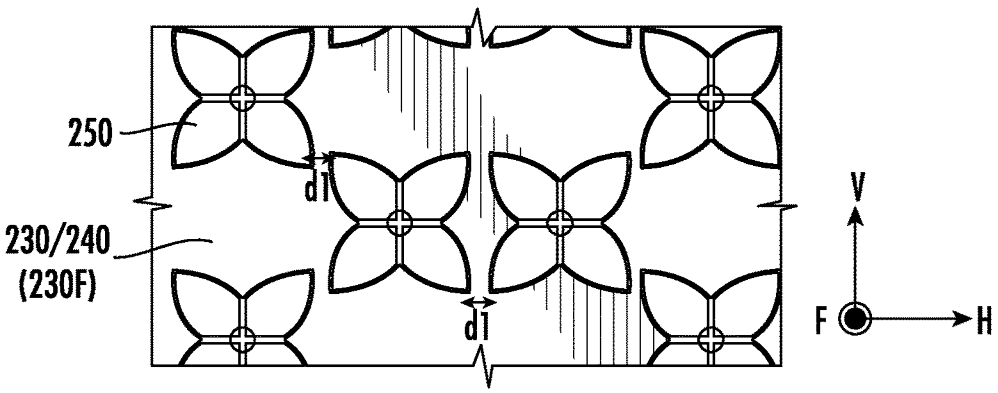
FIG. 3B PRIOR ART
FIG. 3B is an enlarged partial front view of the antenna assembly of FIG. 3A.

FIG. 3B is an enlarged partial front view of the antenna assembly 300 of FIG. 3A. Despite their differences with respect to staggering, the antenna assembly 200 (FIG. 2A) and the antenna assembly 300 (FIG. 3A) may have the same shortest distance d1 between radiating elements 250 of consecutive vertical columns.

Figure 4A:
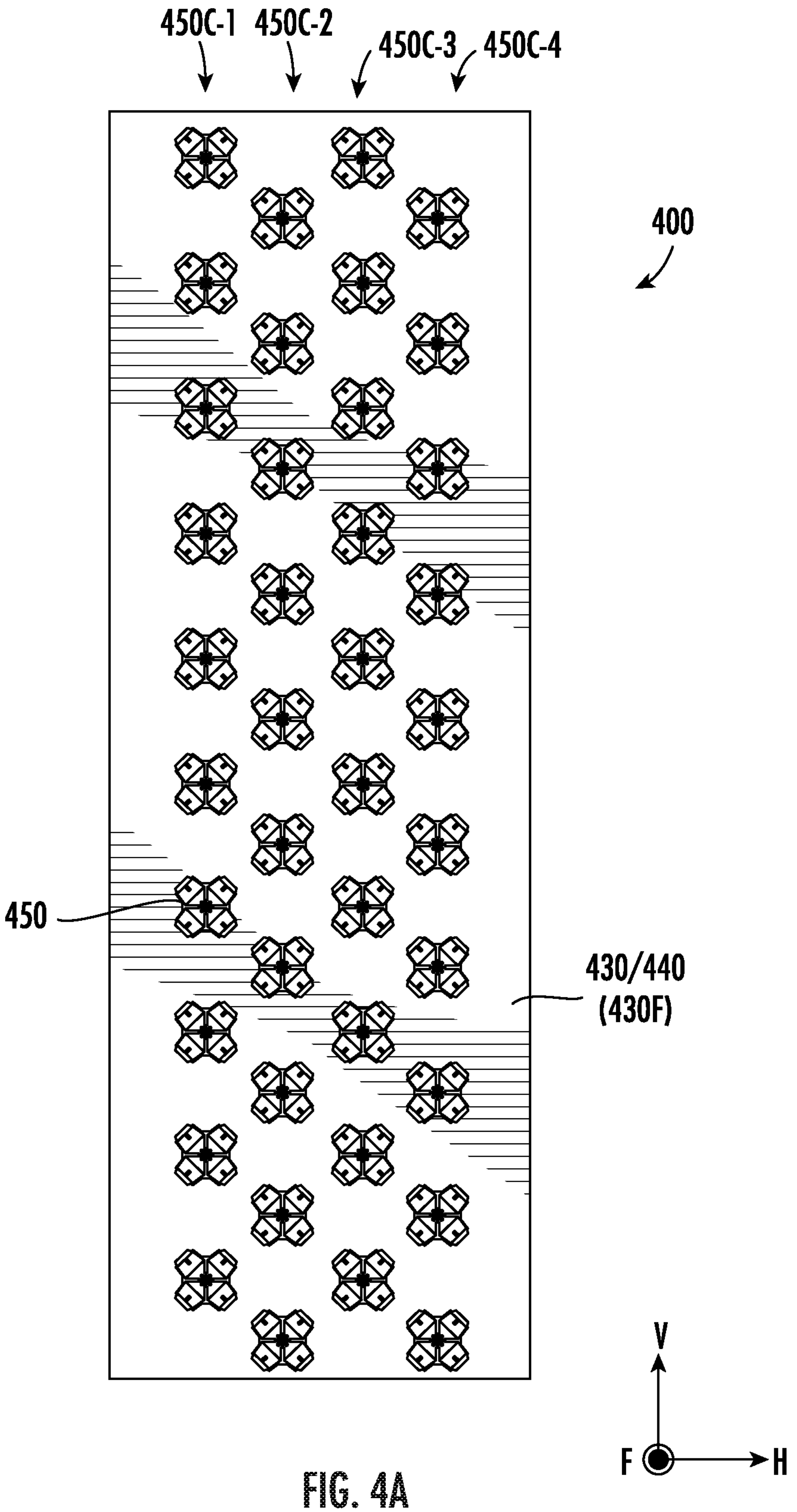
FIG. 4A is a front view of an antenna assembly of a twin-beam base station antenna according to embodiments of the present invention.

FIG. 4A is a front view of an antenna assembly 400 of the twin-beam base station antenna 100 (FIG. 1) according to embodiments of the present invention. The antenna assembly shown in FIG. 4A may be slidably inserted inside the radome 110 that is shown in FIG. 1. To reduce mutual coupling and improve cross polarization distortion relative to the prior art antenna assemblies 200 (FIG. 2A) and 300 (FIG. 3A), the antenna assembly 400 of antenna 100 includes vertically-staggered vertical columns of radiating elements 450 that have smaller radiating elements 450 than radiating elements 250 (FIGS. 2A and 3A) included in the prior art antenna assemblies 200 and 300. As a result, the assembly 400 can provide antenna beams having improved shapes and CPR relative to the assemblies 200 and 300. Moreover, the overall physical aperture of a group (e.g., an array/sub-array) of the radiating elements 450 may be larger, which can improve directivity, and the smaller size of the radiating elements 450 can provide spacing flexibility within the assembly 400. For each of the antenna assemblies 200, 300, and 400, vertical or "azimuth" spacing between radiating elements 450 in adjacent rows that have four radiating elements (which are straight rows for antenna assembly 200, and may be staggered rows for antenna assemblies 300 and 400) was maintained in the vertical direction V at 74 mm to allow for a fair performance comparison between the three different designs.

The radiating elements 450 in the antenna assembly 400 of FIG. 4A are arranged in four adjacent (e.g., consecutive) vertical columns 450C-1 through 450C-4 that are spaced apart from each other in the horizontal direction H. Moreover, the first and third vertical columns 450C-1 and 450C-3 are shown as being vertically staggered in a vertical direction V relative to the second and fourth vertical columns 450C-2 and 450C-4. The vertical columns 450C of radiating elements 450 may extend in the vertical direction V from a lower portion of the assembly 400 to an upper portion of the assembly 400. The vertical direction V may be, or may be parallel with, the longitudinal axis L (FIG. 1). The vertical direction V may also be perpendicular to the horizontal direction H and the forward direction F. As used herein, the term "vertical" does not necessarily require that something is exactly vertical (e.g., the antenna 100 may have a small mechanical down-tilt).

The vertical columns 450C are each configured to transmit and/or receive RF signals in one or more frequency bands, such as one or more bands comprising frequencies between 1,427 MHz and 2,690 MHz or a subset thereof. Though FIG. 4A illustrates four vertical columns 450C-1 through 450C-4, the antenna assembly 400 may include more (e.g., five, six, or more) or fewer (e.g., three) vertical columns 450C. Moreover, the number of radiating elements 450 in a vertical column 450C can be any quantity from two to twenty or more. For example, the four vertical columns 450C-1 through 450C-4 shown in FIG. 4A may each have five to twenty radiating elements 450. In some embodiments, the vertical columns 450C may each have the same number (e.g., ten) of radiating elements 450.

Each radiating element 450 may extend forwardly from a front surface 430F of a reflector 430 of the antenna 100. In some embodiments, one or more groups of the radiating elements 450 may share a feed board 440 that is on the reflector 430. For example, the radiating elements 450 may all be on the same feed board 440, or different arrays/sub-arrays (e.g., different vertical columns 450C) of the radiating elements 450 may be on respective feed boards 440. Typically, one to three radiating elements 450 will be mounted on each feed board 440, with the radiating elements 450 that are co-mounted on the same feed board 440 being adjacent radiating elements 450 that are in the same column 450C.

Figure 4B:
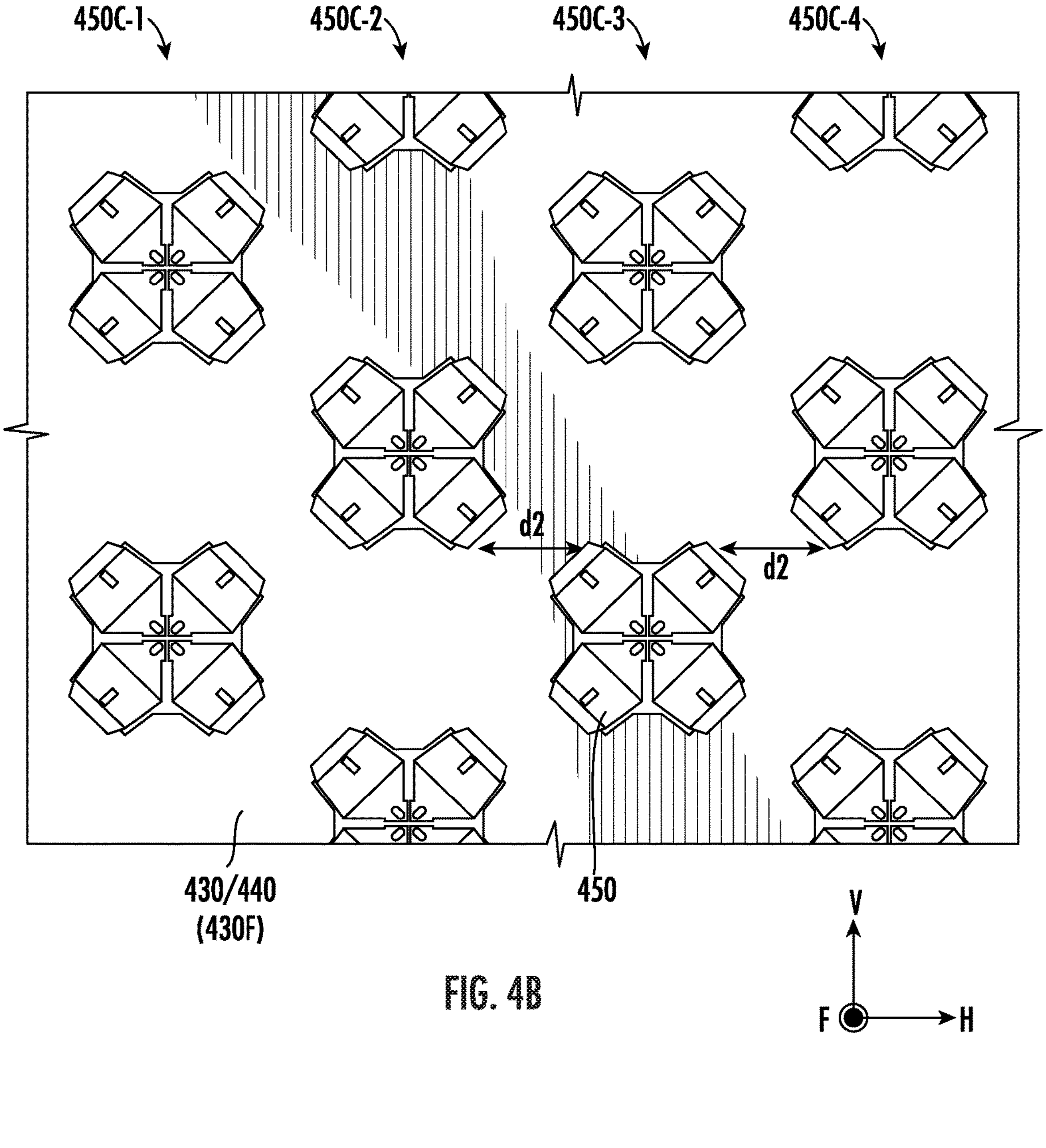
FIG. 4B is an enlarged partial front view of the antenna assembly of FIG. 4A.

FIG. 4B is an enlarged partial front view of the antenna assembly 400 of FIG. 4A. Adjacent vertical columns 450C of the radiating elements 450 have a shortest distance d2 therebetween in the horizontal direction H. For example, the distance d2 may be at least 30 mm or at least 35 mm (e.g., 35.3 mm). Accordingly, the distance d2 may be significantly longer than the distance d1 (FIGS. 2B and 3B) between radiating elements 250 in adjacent vertical columns in the prior art antenna assemblies 200, 300 of FIGS. 2B and 3B.

In some embodiments, the distance d2 may be a distance between (a) a first tip portion 4531 (FIG. 4C) of a radiating element 450 of the first vertical column 450C-1 and (b) a second tip portion 453T of a radiating element 450 of the second vertical column 450C-2. Moreover, because the distance d2 is the shortest distance between the adjacent vertical columns 450C-1 and 450C-2, the second tip portion 4531 may be closer to the first tip portion 453T than to any other tip portion of any radiating element 450 of the first vertical column 450C-1.

Figure 4C:
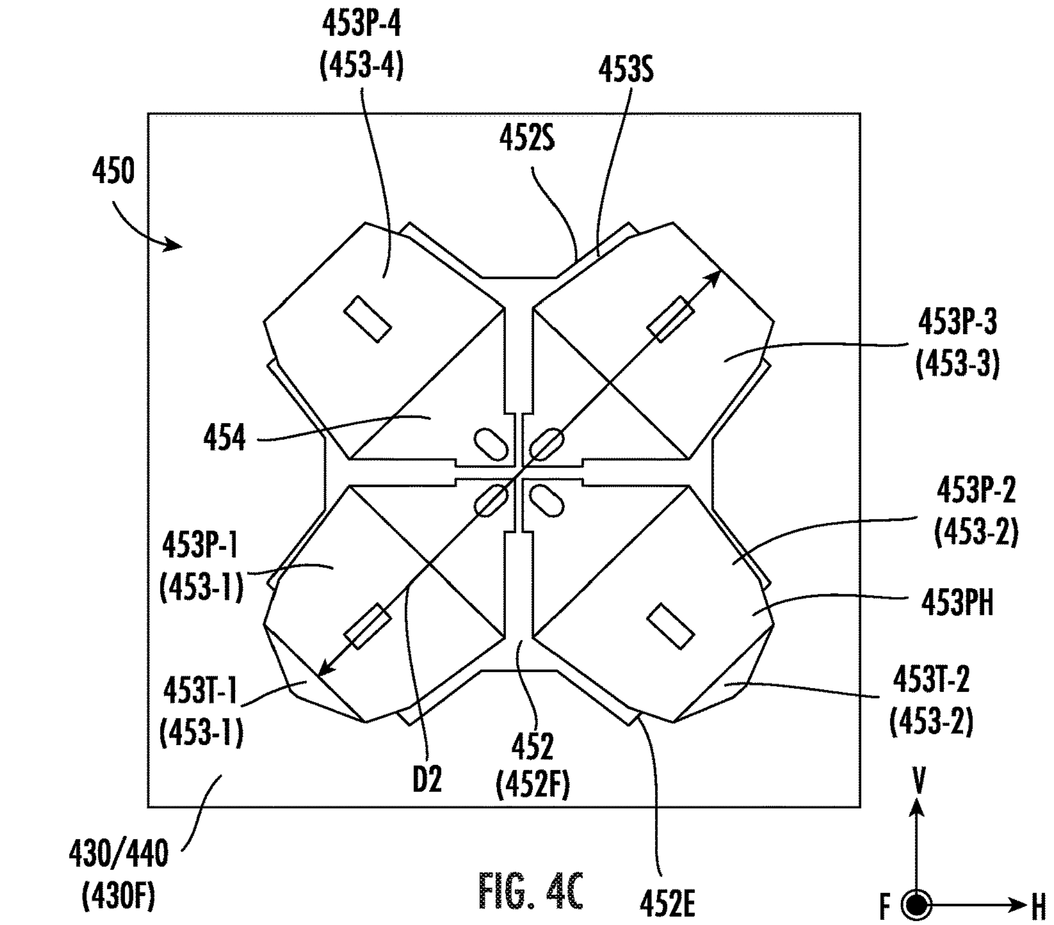
FIG. 4C is an enlarged front view of a radiating element of FIG. 4B.

FIG. 4C is an enlarged front view of a radiating element 450 of FIG. 4B, As shown in FIG. 4C, the radiating element 450 may include a plurality of metal radiator arms 453 that are on a PCB 452. For example, the radiating element 450 may be a crossed-dipole radiating element that comprises four metal radiator arms 453-1 through 453-4, such as respective sheet-metal dipole arms. Example sheet-metal dipole arms are discussed in U.S. patent application Ser. No. 16/861,427, the disclosure of which is hereby incorporated herein by reference in its entirety. The PCB 452 may include four conductive plates 454 that are disposed rearwardly of the sheet-metal dipole arms 453-1 through 453-4. Each conductive plate 454 may capacitively couple with a respective one of the sheet-metal dipole arms 453-1 through 453-4 to pass RF signals between the feed stalks 451 and the sheet-metal dipole arms 453-1 through 453-4. Each radiator arm 453 may include (i) a base portion 453P that is on a respective one of the conductive plates 454 on the PCB 452 and (ii) a tip portion 4531 that protrudes above or below the PCB 452 in the forward direction F. As an example, the base portion 453P may be on (e.g., mostly or entirely on) a surface 452F of the PCB 452 that is parallel to the surface 430F of the reflector 430.

Accordingly, the base portion 453P may be parallel to the surface 430F, and the tip portion 453T may not be parallel to the surface 430F. Rather, the tip portion 4531 may be bent (e.g., angled/folded) relative to the base portion 453P that is connected thereto such that the tip portion 4531 faces a center axis 455 (FIG. 4D; e.g., an imaginary line) that extends in the forward direction F through a center point of the radiating element 450. In particular, the tip portion 453T may be perpendicular to the base portion 453P or may otherwise be at an angle of 45 degrees or smaller relative to the center axis 455.

In some embodiments, the base portion 453P may include an overhang region 453PH that extends beyond an outer edge 452E of the PCB 452. Accordingly, in the forward direction F, the PCB 452 does not intervene between the overhang region 453PH and the reflector 430.

Each radiator arm 453 may, in some embodiments, have only one bend/fold, which is provided with respect to (e.g., defined by) the protruding tip portion 4531. Accordingly, edge regions 453S of each base portion 453P that are adjacent opposite side edges 452S, respectively, of the PCB 452 may be flat rather than bent up or down. The opposite edge regions 453S thus have no protrusions therefrom in the forward direction F but rather are entirely parallel to the surface 430F of the reflector 430.

As noted above, the radiating element 450 may include four conductive plates 454 that are on the surface 452F of the PCB 452 and that couple the base portion 453P of each sheet-metal arm 453 to the PCB 452. In some embodiments, the conductive plates 454 and the base portion 453P may include different metals, respectively. For example, the conductive plates 454 may be copper plates and the base portion 453P may be sheet metal comprising aluminum or steel. The tip portion 4531 and the base portion 453P may, in some embodiments, be contiguous portions of the same continuous piece of sheet metal.

Because tip portions 453T of the radiating element 450 are bent relative to base portions 453P, the PCB 452 that has bent radiator arms 453 thereon can be narrower than the radiator PCB 252 of FIG. 2D and a widest dimension D2 of the radiating element 450 may thus be significantly narrower than the dimension D1 (FIG. 2D) of the radiating element 250. As an example, the dimension D2 may be no more than 68 mm (e.g., 67.8 mm) in a direction that parallels the surface 430F of the reflector 430. Accordingly, the radiating element 450 may be 27% more compact than the radiating element 250, and thus may provide better isolation performance and better spacing flexibility inside the antenna 100 (FIG. 1).

Figure 4D:
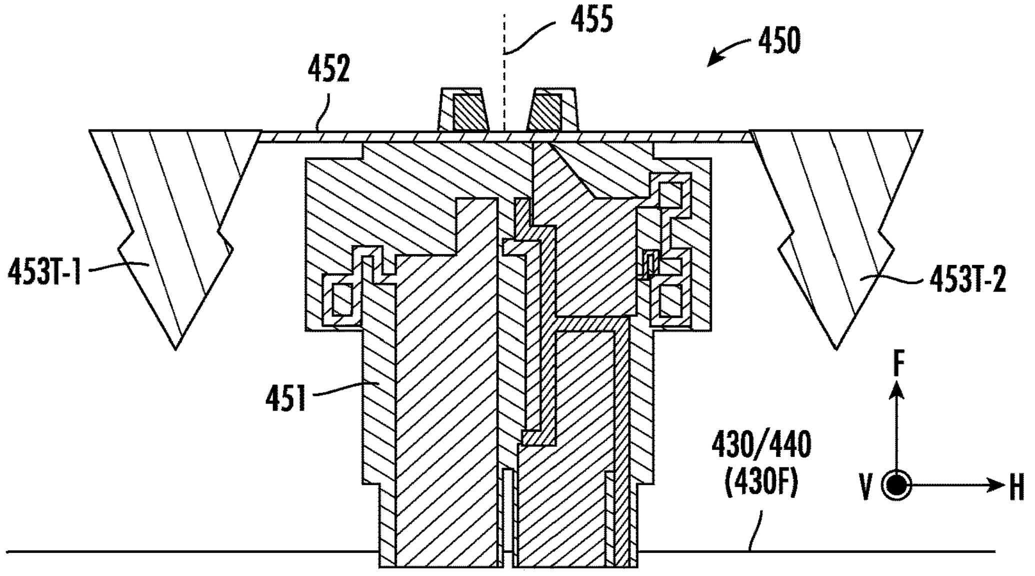
FIG. 4D is a profile view of the radiating element of FIG. 4C.

FIG. 4D is a profile view of the radiating element 450 of FIG. 4C. As shown in FIG. 4D, a plurality of tip portions 4531 of respective metal radiator arms 453 may each protrude below the PCB 452 toward the surface 430F of the reflector 430. Accordingly, the tip portions 4531 may face PCB feed stalks 451 and a center axis 455 of the radiating element 450.

Figure 4E:
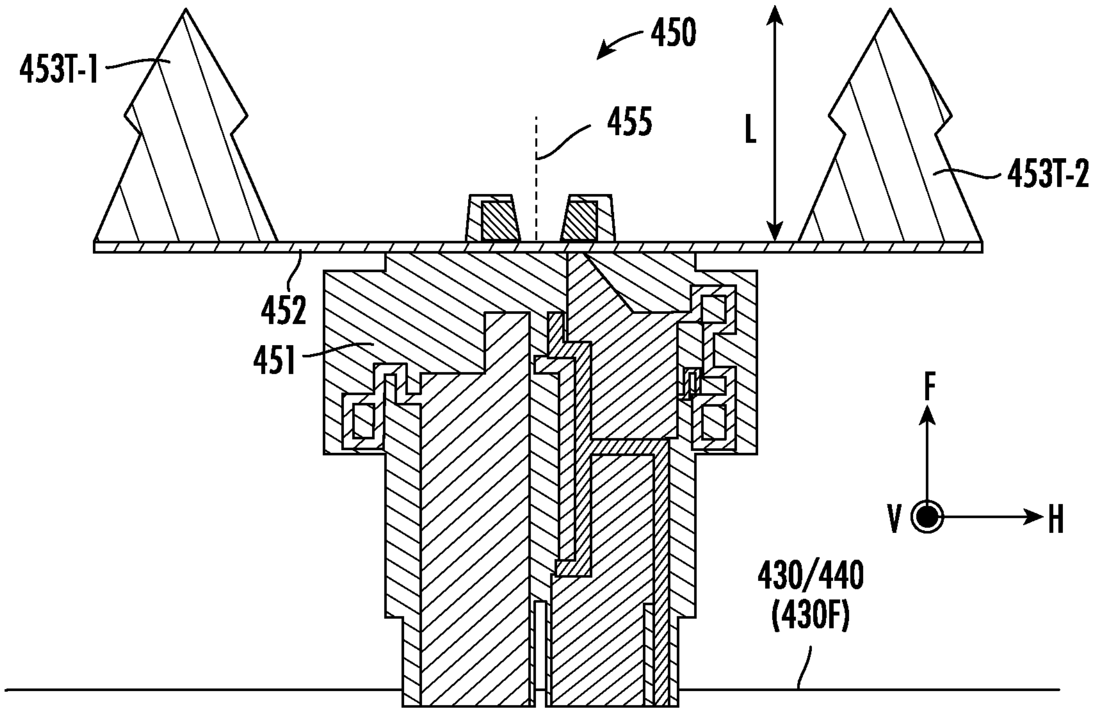
FIG. 4E is a profile view of the radiating element of FIG. 4C with tip portions protrude upward.

FIG. 4E is a profile view of the radiating element 450 of FIG. 4C with tip portions 453T bent upward in the forward direction F relative to base portions 453P (FIG. 4C) as opposed to being bent downwardly/rearwardly as in FIG. 4D. Specifically, the tip portions 4531 of respective metal radiator arms 453 may each protrude above the PCB 452 away from the surface 430F of the reflector 430. Accordingly, the tip portions 4531 may face a center axis 455 of the radiating element 450.

Moreover, a longest length L of each tip portion 4531 may be shorter than the distance d2 (FIG. 4B) that is between consecutive vertical columns 450C (FIG. 4B). For example, the length L may be shorter than 35.3 mm and longer than 10 mm. The tip portion 453T may be narrower, in a direction that is perpendicular to the length L, than the base portion 453P. In some embodiments, the tip portion 453T and the base portion 453P may have respective shapes that are generally tapered away from the PCB 452 and away from the center axis 455, respectively.

Figure 4F:
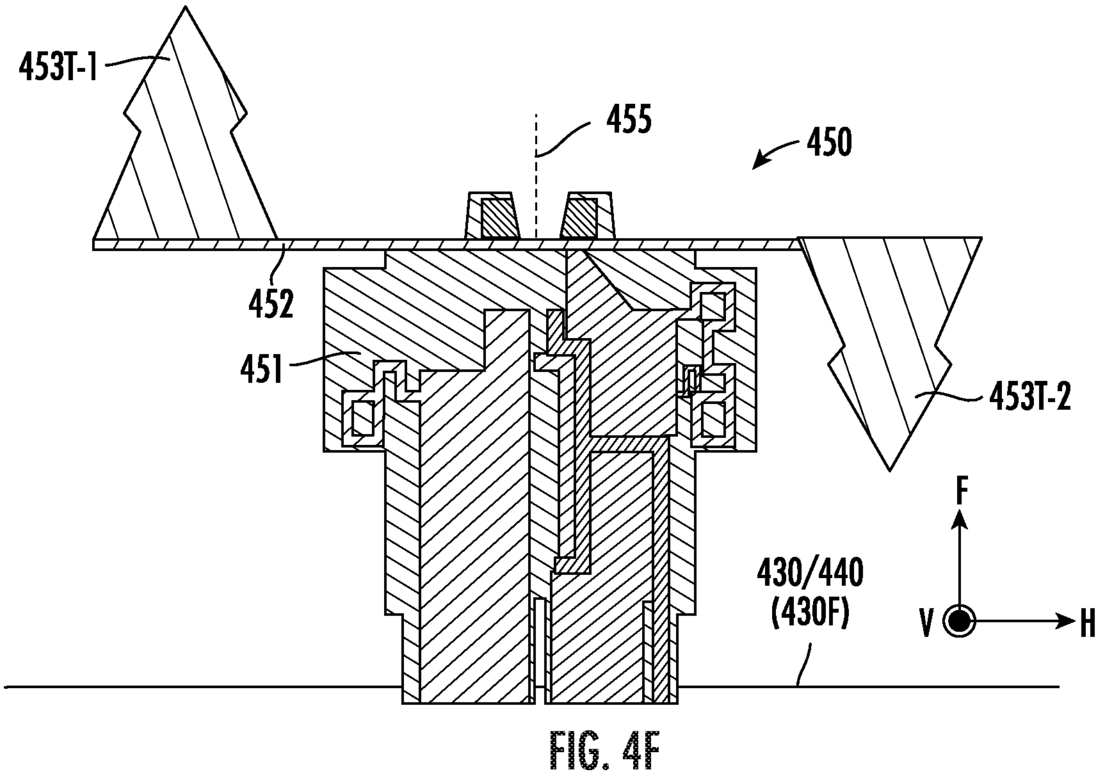
FIG. 4F is a profile view of the radiating element of FIG. 4C with tip portions that protrude in different directions.

FIG. 4F is a profile view of the radiating element 450 of FIG. 4C with tip portions 4531 bent in different (e.g., opposite) directions that are nonparallel to the surface 430F of the reflector 430. For example, a first tip portion 453T-1 of a first metal radiator arm 453-1 (FIG. 4C) of the radiating element 450 and a second tip portion 453T-2 of a second metal radiator arm 453-2 (FIG. 4C) of the radiating element 450 may protrude upward and downward, respectively, in the forward direction F. Accordingly, the first tip portion 453T-1 protrudes above the PCB 452 away from the surface 430F, and the second tip portion 453T-2 protrudes below the PCB 452 toward the surface 430F. Likewise, tip portions 453T of third and fourth metal radiator arms 453-3 and 453-4 (FIG. 4C) of the radiating element 450 may protrude above and below, respectively, the PCB 452. Such a combination of tip portions 4531 that protrude in different directions can provide even better antenna performance (e.g., better isolation) than the tip portions 453T of FIGS. 4D and 4E that protrude in the same direction.

In some embodiments, each radiating element 450 in the antenna assembly 400 (FIG. 4A) may be a dual-polarized radiating element, such as a crossed-dipole radiating element that includes a negative-polarization (e.g., a slant −45°) dipole radiator and a positive-polarization (e.g., a slant +45°) dipole radiator. Accordingly, in some embodiments, the negative-polarization dipole radiator may include the first and third metal radiator arms 453-1 and 453-3 and the positive-polarization dipole radiator may include the second and fourth metal radiator arms 453-2 and 453-4, or vice versa.

Moreover, each radiating element 450 in the assembly 400 may, in some embodiments, have tip portions 453T that are bent in different directions (FIG. 4F). In such embodiments, the radiating elements 450 may be arranged so that the closest dipole arms 453 on adjacent radiating elements 450 are arranged so that one of the dipole arms 453 has a tip portion 4531 that is bent upward and the other dipole arm 453 has a tip portion 4531 that is bent downward. In other words, to the extent possible, each dipole arm 453 in a first radiating element 450 has a tip portion 453T that is bent in a different direction with respect to the dipole arm 453 of another radiating element 450 that is the closest thereto. In other embodiments, the tip portions 453T of each radiating element 450 in the assembly 400 may all be bent downward (FIG. 4D) or all be bent upward (FIG. 4E). In still further embodiments, the tip portions 453T of some (e.g., one vertical column 450C (FIG. 4B)) of the radiating elements 450 in the assembly 400 may all be bent in a particular one of the manners shown in FIGS. 4D-4F, while the tip portions 453T of others (e.g., a different column 450C) of the radiating elements 450 in the assembly 400 may all be bent in another one of the manners shown in FIGS. 4D-4F. For example, the tip portions 453T of the first column 450C-1 may all be bent downward and the tip portions 453T of the second column 450C-2 may all be bent upward, or vice versa.

Twin-beam base station antennas 100 (FIG. 1) having bent metal radiator arms 453 (FIG. 4C) according to embodiments of the present invention may provide a number of advantages. These advantages include increased spacing (by a distance d2) between radiating elements 450 (FIG. 4B) that are in consecutive vertical columns 450C (FIG. 4B), due to a smaller dimension D2 (FIG. 4C) that tip portions 453T (which are bent relative to base portions 453P) of the radiator arms 453 facilitate for each radiating element 450. This increased spacing, along with vertical staggering of the vertical columns 450C, can reduce mutual coupling that may otherwise be strong at lower frequencies (e.g., 1,695 MHz). The increased spacing may also improve cross polarization distortion. The reduced mutual coupling and improved cross polarization distortion can result in improved radiation pattern shapes and improved CPR at the lower frequencies. Moreover, the overall physical aperture of a group of the radiating elements 450 may be larger, which can improve directivity, and the smaller dipole size of the radiating elements 450 can provide spacing flexibility to reduce/avoid interference with other frequency bands.

It will be appreciated that the present specification only describes a few example embodiments of the present invention and that the techniques described herein have applicability beyond the example embodiments described above.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a reflector; and a plurality of vertically-staggered vertical columns of radiating elements that are on a surface of the reflector and are configured to transmit radio frequency (RF) signals in a frequency band, wherein a metal radiator arm of each of the radiating elements comprises a base portion that is parallel to the surface of the reflector and a tip portion that is not parallel to the surface of the reflector, wherein each of the radiating elements comprises a printed circuit board (PCB) that is parallel to the surface of the reflector, wherein the base portion of the metal radiator arm of each of the radiating elements directly contacts the tip portion and extends on a surface of the PCB and is parallel to the surface of the PCB, and wherein the tip portion of the metal radiator arm of each of the radiating elements protrudes either away from the surface of the reflector or toward the surface of the reflector.

2. The base station antenna of claim 1, wherein the tip portion of the metal radiator arm of each of the radiating elements on the PCB comprises first.

3. The base station antenna of claim 2, wherein the first of the tip portions and the second of the tip portions both protrude away from the surface of the reflector.

4. The base station antenna of claim 2, wherein the first of the tip portions and the second of the tip portions both protrude toward the surface of the reflector.

5. The base station antenna of claim 2,
wherein the first of the tip portions protrudes away from the surface of the reflector, and
wherein the second of the tip portions protrudes toward the surface of the reflector.

6. The base station antenna of claim 1, further comprising a conductive plate that is on the PCB and that couples the base portion of the metal radiator arm to the PCB,
wherein the conductive plate and the base portion of the metal radiator arm comprise different metals, respectively.

7. The base station antenna of claim 6, wherein the conductive plate comprises a copper plate.

8. The base station antenna of claim 1, wherein a widest dimension of each of the radiating elements is no more than 68 millimeters in a direction that parallels the surface of the reflector.

9. The base station antenna of claim 1,
wherein the plurality of vertically-staggered vertical columns comprise consecutive first, second, third, and fourth vertical columns, and
wherein the first and third vertical columns are vertically staggered relative to the second and fourth vertical columns.

10. The base station antenna of claim 9, wherein the first and second vertical columns are spaced apart from each other by at least 35 millimeters.

11. The base station antenna of claim 1,
wherein the base portion of the metal radiator arm and the tip portion of the metal radiator arm are contiguous portions of a continuous piece of sheet metal, and
wherein opposite edge regions of the base portion are flat.

12. The base station antenna of claim 1, wherein facing dipole arms of respective radiating elements in adjacent columns of the plurality of vertically-staggered vertical columns have tip portions that protrude in different directions relative to one another.

13. A base station antenna comprising a plurality of vertically-staggered vertical columns of radiating elements that are configured to transmit radio frequency (RF) signals in a frequency band and that have bent metal radiator arms comprising tip portions that face respective center axes of the radiating elements,
wherein each of the radiating elements comprises a printed circuit board (PCB),
wherein a base portion of the metal radiator arm of each of the radiating elements is on the PCB, and
wherein the tip portions of the metal radiator arm of each of the radiating elements protrude from a surface of the PCB.

14. The base station antenna of claim 13, wherein consecutive ones of the plurality of vertically-staggered vertical columns are spaced apart from each other by at least 30 millimeters.

15. The base station antenna of claim 13, wherein a first and a second of the tip portions protrude in opposite directions, respectively.

16. The base station antenna of claim 15, further comprising a reflector,
wherein the radiating elements are on a surface of the reflector, and
wherein each of the opposite directions is nonparallel to the surface of the reflector.

17. A base station antenna, comprising:
a reflector; and
first and second vertical columns of radiating elements that are on a surface of the reflector and are configured to transmit radio frequency (RF) signals in a frequency band,
wherein each of the radiating elements comprises a printed circuit board (PCB) that is parallel to the surface of the reflector,
wherein a first metal dipole arm of a first of the radiating elements of the first vertical column comprises a first tip portion that protrudes away from the surface of the reflector, the first metal dipole arm comprising a first base portion that is on the PCB, and
wherein a second metal dipole arm of a second of the radiating elements of the second vertical column comprises a second tip portion that protrudes toward the surface of the reflector, the second metal dipole arm comprising a second base portion that is on the PCB.

18. The base station antenna of claim 17, wherein a third metal dipole arm of the first of the radiating elements comprises a third tip portion that protrudes toward the surface of the reflector.

19. The base station antenna of claim 17, further comprising third and fourth vertical columns of radiating elements that are on the surface of the reflector and are configured to transmit RF signals in the frequency band,
wherein the first, second, third, and fourth vertical columns are consecutive vertical columns,
wherein the first and third vertical columns are vertically staggered relative to the second and fourth vertical columns, and
wherein the second tip portion is closer to the first tip portion than to any other tip portion of the first vertical column.

20. The base station antenna of claim 19, wherein a shortest distance between the first and second vertical columns is longer than a length of the first tip portion.

* * * * *